United States Patent

[11] 3,612,431

[72] Inventors Raymond G. Poland
Holland Patent;
Gerald S. Stevens, Jr., Utica, both of N.Y.

[21] Appl. No. 862,660
[22] Filed Oct. 1, 1969
[45] Patented Oct. 12, 1971
[73] Assignee Mohawk Data Sciences Corporation
Herkimer, N.Y.

[54] TAPE HANDLER WITH ANTIHUNT AND PNEUMATIC REWIND CONTROL
10 Claims, 4 Drawing Figs.

[52] U.S. Cl. .................................................... 242/189, 242/204
[51] Int. Cl. .................................................... B65h 59/38, B65h 63/02, G11b 15/32
[50] Field of Search ....................................... 242/189–191, 204–210; 226/95, 97

[56] References Cited
UNITED STATES PATENTS

| | | | |
|---|---|---|---|
| 2,725,200 | 11/1955 | Ward ............................ | 242/189 |
| 3,102,698 | 9/1963 | Atsumi ......................... | 242/189 |

*Primary Examiner*—Leonard D. Christian
*Attorneys*—Francis J. Thomas, Richard H. Smith, Thomas C. Siekman and Sughrue, Rothwell, Mion, Zinn and Macpeak

ABSTRACT: A tape handler having a shiftable drive capstan engageable with the takeup reel shaft under control of the takeup dancer arm employs an antibackup detent acting on the takeup shaft to prevent the takeup reel from oscillating in a hunting-type action when the dancer arm resides in its nominal or rest position. Additionally, pneumatic control means are provided to actuate the tape rewind drive and to simultaneously disable the antibackup detent.

INVENTORS
RAYMOND G. POLAND
GERALD S. STEVENS JR.
BY, Richard H. Smith
ATTORNEY

TAPE HANDLER WITH ANTIHUNT AND PNEUMATIC REWIND CONTROL

BACKGROUND OF THE INVENTION

In designing a low cost, reliable tape handler it is desirable to perform multiple functions with the same component whenever possible. One such economization has been to employ the tape drive capstan motor, which operates on a continuous, constant velocity basis to additionally drive the tape takeup reel. This is done through the use of a continuously rotating drive capstan connected to the motor and mounted for movement into and out of engagement with the takeup shaft. Shifting of the capstan if controlled by a mechanical servo including a tape loop sensing device which causes the capstan to shift toward the takeup shaft, and hence to apply torque thereto, when the tape loop increases and which causes the capstan to be shifted away from the shaft when the tape loop decreases.

A problem encountered with the above type of simple mechanical servomechanism is found in the mechanism's tendency to hunt about the nominal or static position. This is caused by the drive capstan kissing or lightly engaging the takeup shaft, resulting in a bouncing of the capstan thereon which in turn produces a noticeable oscillation of the takeup reel. This is undesirable both from a control standpoint and from an esthetic standpoint. On the latter score, the oscillating takeup reel has a tendency to distract and disturb the concentration of an operator who might be working in front of or next to the tape mechanism, performing, for example, data-keying operations.

Further, with tape handlers of the type described, it is common to provide pneumatic control in connection with some phase of tape feeding or guiding. A source of vacuum (subatmospheric pressure) is therefore provided and made available in such machines. It is thus desirable from an economy standpoint to utilize the vacuum as a source of control for as many functions as possible.

Objects and Summary of the Invention

It is therefore an object of the present invention to provide an inexpensive, simple and reliable tape-handling device which eliminates undue takeup reel oscillating caused by hunting of the reel drive servo.

A further object is to provide a tape handler of the type described which utilizes vacuum controlled means for performing the tape rewind function.

In accordance with a first aspect of the invention, an antibackup mechanism is provided to coact with the takeup reel drive shaft to eliminate the hunting action of the takeup servomechanism. Control means associated with the antibackup mechanism operate to disable it under certain conditions calling for reverse feeding of the tape and in the rewind mode of operation.

In accordance with the second aspect of the invention, a rewind drive capstan is mounted adjacent the supply reel shaft and is energized, when a rewind operation is called for, under control of the vacuum source.

These and other objects, features and advantages will be made apparent by the following detailed description of a preferred embodiment of the invention, the description being supplemented by drawings as follows:

DETAILED DESCRIPTION OF THE EMBODIMENT

Figure 1:
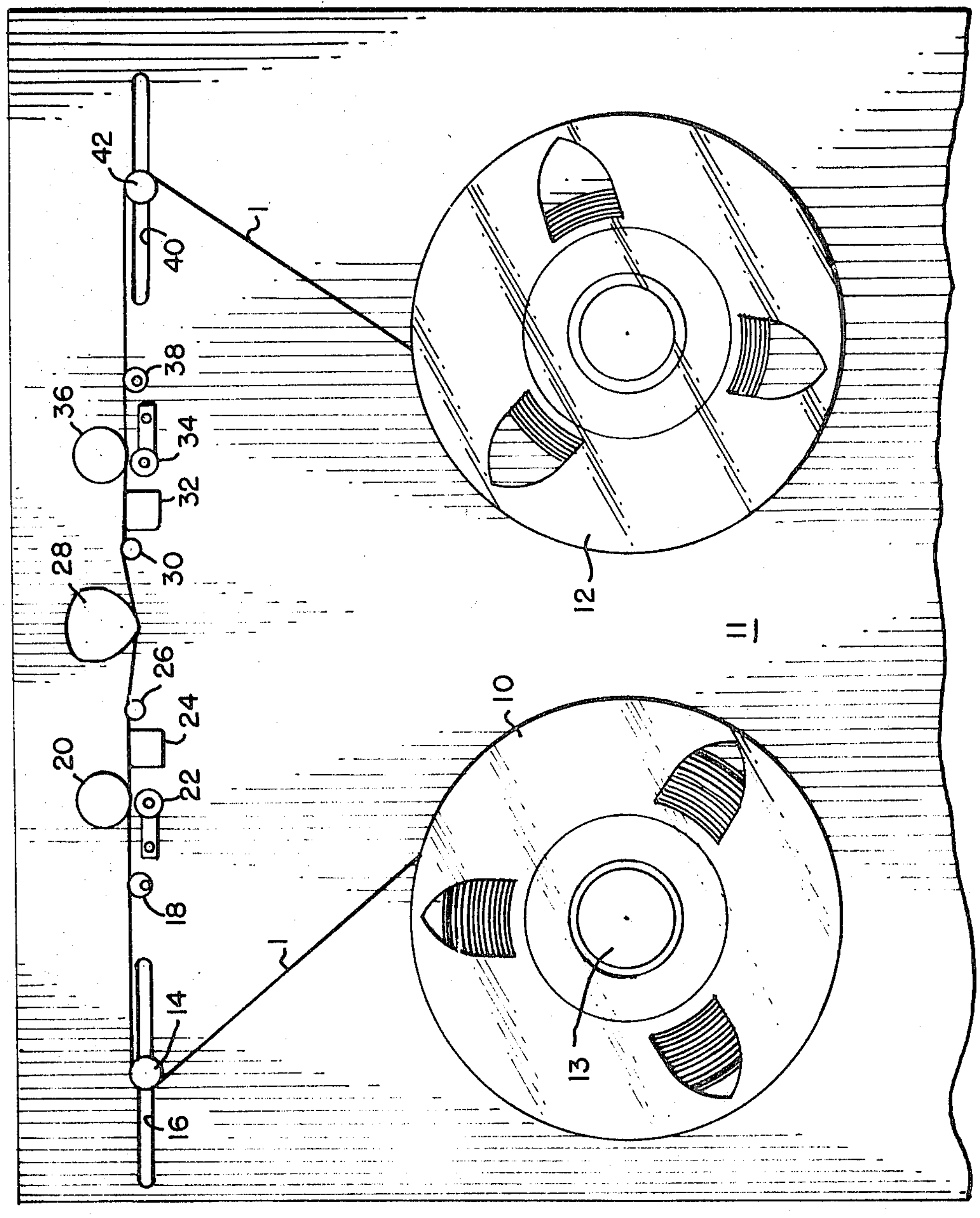
FIG. 1 is a front elevation view of a preferred embodiment of the tape-handling device of the invention.

Referring to FIG. 1, a tape supply reel 12 supplies tape 1 to a takeup reel 10. A forward feed capstan 20 continuously rotates in a clockwise direction and cooperates with a pinch roll 22 to pull tape from reel 12 and feed it to reel 10. In the process the tape is moved in the forward direction (right to left) beneath a magnetic transducer head 28 for data write or read operations. A pair of guide pins 26 and 30 establish a proper angle of wrap of the tape about the transducer and in addition provide skew control. A pair of suction members 24 and 32 provided with a plurality of openings on their upper surfaces are connected to a vacuum source to provide a constant friction drag on the tape to prevent inertial overshoot thereof during stopping operations. A pair of additional guide members 18 and 38 provide adjustable control of the tape plane. A backspace capstan 36 is continuously driven in a counterclockwise direction and cooperates with a pinch roll 34 to move the tape in the backspace (left to right) direction when such is called for. Naturally, pinch rolls 22 and 34 operate on a mutually exclusive basis.

Figure 2:
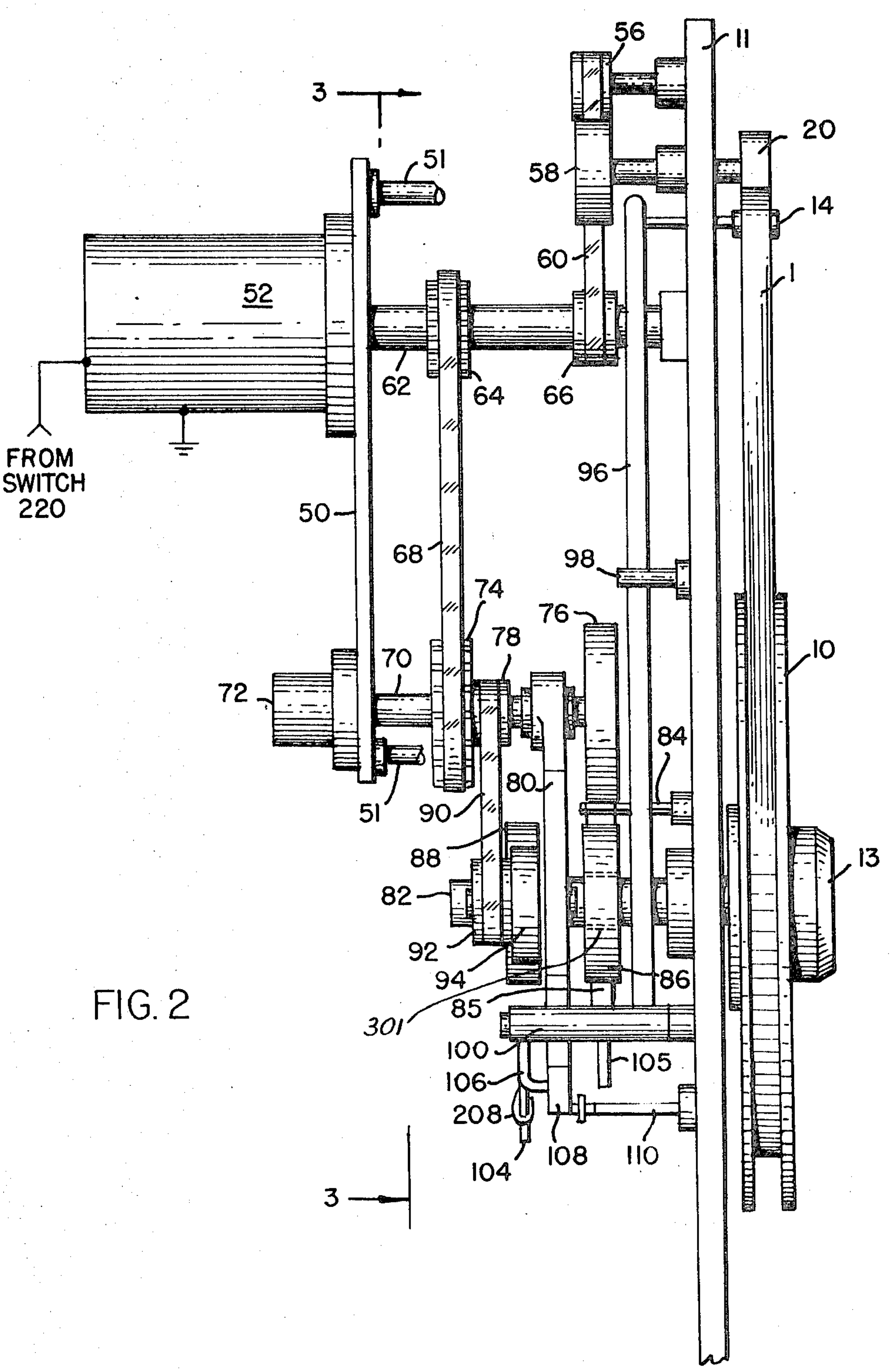
FIG. 2 is a left side elevation view of the tape handler of FIG. 1.
Figure 3:
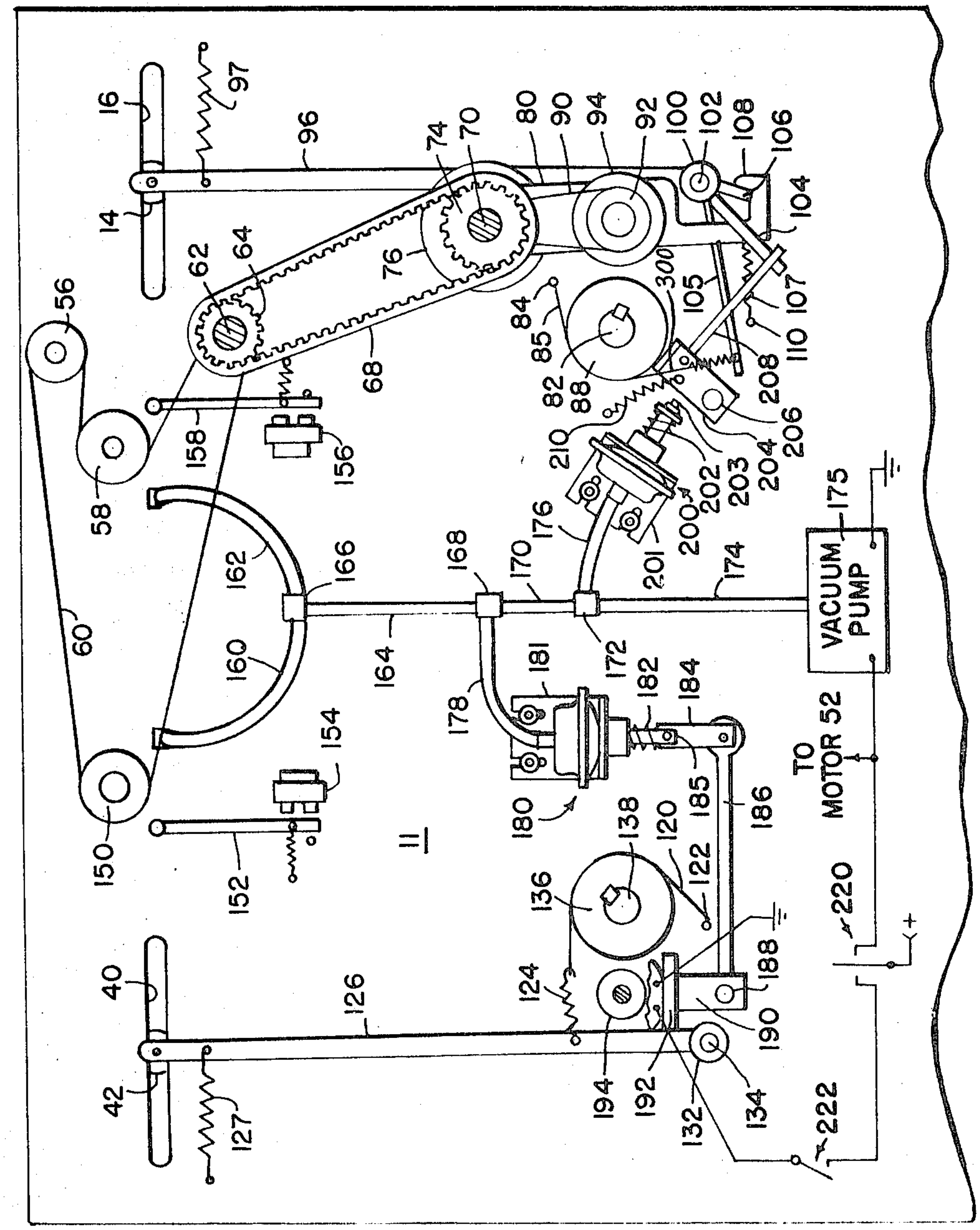
FIG. 3 is a rear elevation view of the preferred embodiment, showing the details of the tape feeding and reeling controls.
Figure 4:
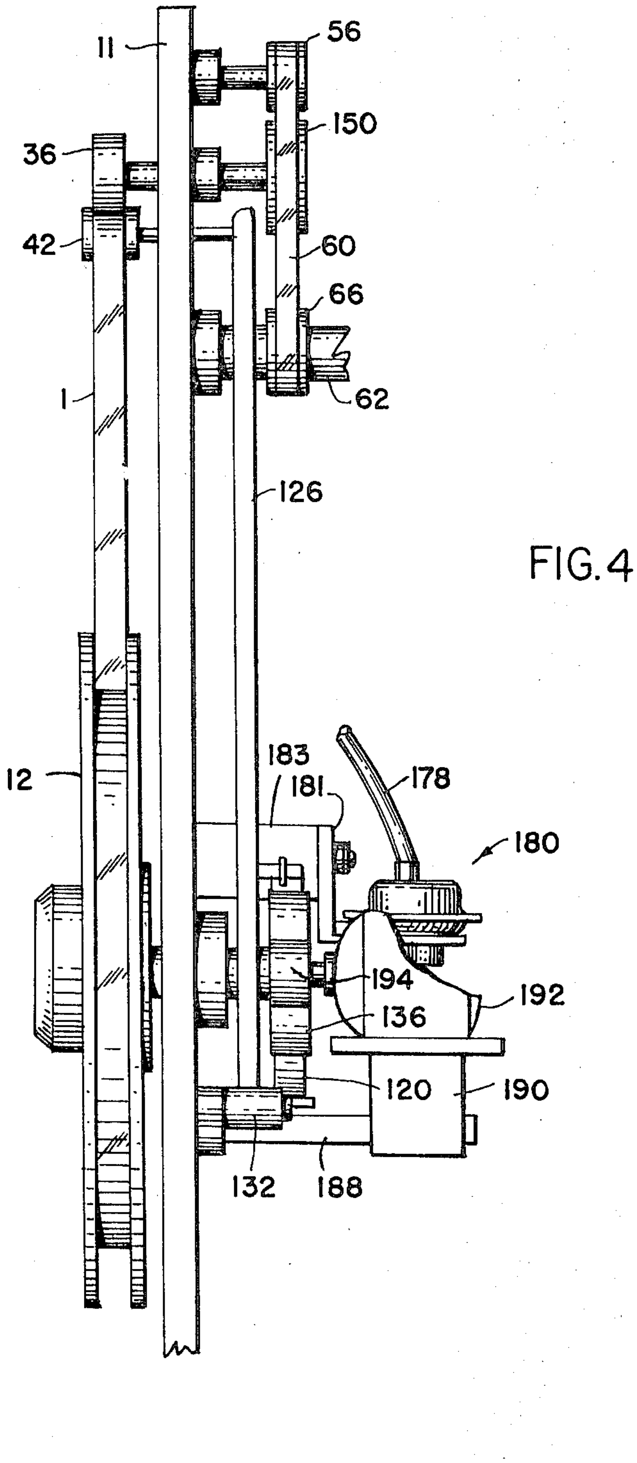
FIG. 4 is a right side elevation view of the tape handler of FIG. 1.

Rotation of the reels 10 and 12 is controlled by a pair of servomechanisms including a pair of shiftable dancer rolls 14 and 42. Referring to FIGS. 2, 3 and 4 it can be seen that these dancer rolls are mounted on axles extending through a pair of slots 16 and 40, respectively in front plate 11. Roll 14 is supported at the upper end of a dancer arm 96 and roll 42 is supported at the upper end of a dancer arm 126.

Arm 96 is biased to the right by a tension spring 97 and is mounted on a sleeve 100 which is pivotable about a pivot stud 102 connected to front plate 11. Arm 126 is biased to the left by a tension spring 127 and is mounted on a sleeve 132 pivotable about a pivot stud 134.

The tape feed capstans are powered by a drive motor 52 (FIG. 2) mounted to a plate 50 affixed to front plate 11 by a set of supports 51. The output drive shaft 62 of the motor 52 is journaled in front plate 11 and supports a drive pulley 66 which cooperates with a belt 60 entrained about a backspace capstan drive pulley 150, an idler pulley 56 and a forward feed capstan drive pulley 58. Pulleys 150 and 58 drive capstans 36 and 20, respectively. Motor 52 continuously rotates shaft 62 in the clockwise direction (as viewed in FIG. 3), thus driving pulley 150 clockwise and pulley 58 counterclockwise. A pair of solenoids 154 and 156 are selectively operable to control pinch rolls 34 and 22, respectively, via control arms 152 and 158.

Torque for driving the takeup reel is also supplied by motor 52. A timing gear 64 is fixed to the shaft 62 and drives a timing belt 68 which in turn drives a timing gear 74 fixed to a shaft 70. The latter is journaled at its left-hand end (FIG. 2) in a bearing 72 mounted on plate 50. Shaft 70 drives a pulley 78 and is provided with a flywheel 76 at its right-hand end.

Pulley 78 drives a belt 90 which in turn rotates a pulley 92 connected to a capstan 94. The latter is coated with a friction material for drive purposes, explained subsequently. Shaft 70 also serves as a pivot support for a pivotable arm 80 which supports the axle about which the capstan 94 and pulley 92 rotate. Arm 80 is biased to the left (FIG. 3) by a tension spring 107 and coacts with an L-shaped arm 106 connected to sleeve 100. The tip of arm 106 contacts an ear 108 appended to the bottom of arm 80 and causes the arm to pivot counterclockwise when dancer arm 96 pivots counterclockwise. Spring 107 pulls arm 80 to the left when dancer arm 96 pivots clockwise.

Takeup reel 10 is mounted on a shaft 82 journaled in front plate 11. A drive roll 88 is keyed to shaft 82. In addition, the shaft supports a brake roll 86 which is mounted on the shaft by a bushing 301 which permits only unidirectional rotation between the shaft and the roll. Viewing the machine from the rear (FIG. 3) roll 86 is free to rotate only counterclockwise with respect to shaft 82.

Drive roll 88 cooperates with capstan 94 to supply counterclockwise (as viewed in FIG. 3) torque to shaft 82 to drive the takeup reel in the takeup direction. Brake roll 86 cooperates with a break band 85 which is secured to an anchor pin 84 at one end and which is spring-connected to a control arm 105 at the other end. Arm 105 is fixed to sleeve 100 and thus pivots with dancer arm 96 whereupon a braking force is applied by band 85 to roll 86 when arm 96 pivots counterclockwise. This force is decreased when the arm pivots clockwise.

A wedge-action detent member 204, pivotable about a support pin 206, is provided adjacent drive roll 88 and cooperates therewith to prevent the roll and the takeup shaft and reel from rotating in the clockwise, nontakeup direction (as viewed in FIG. 3). The end of detent 204 which engages roll 88 is covered with a friction material such as urethane and is oriented at a slight angle off of the perpendicular to the longitudinal axis of the detent 204. As a result, when roll 88 attempts to rotate clockwise the detent tends to pivot counterclockwise, thus being drawn in wedge fashion between roll 88 and the fixed pivot mount 206. On the other hand, when roll 88 rotates counterclockwise detent 204 pivots away from contact with the roll (although it does not actually separate therefrom), thus not providing the wedge action. A tension spring 210 biases the detent counterclockwise and holds it in an operative position with respect to the roll.

While the tape-handling system is generally not required to backspace tape between forward feed cycles more than the amount permitted by the leftward excursion of arm 96, is is occasionally necessary to effect a long backspace which requires that the takeup reel be rotated in the nontakeup direction to yield tape. To this end, a control arm 104 is affixed to sleeve 100 and cooperates with a link 208 connected to detent 204. Link 208 is provided with a hook (FIG. 2) at its outer end which cooperates with arm 104. When a backspace feed operation draws arm 96 leftward beyond the approximate position shown in FIG. 3, arm 104 engages the hooked end of arm 208 and continued backspacing of the tape draws arm 96 further to the left and causes arm 104 to pivot detent 204 clockwise, removing it from its operative position with respect to roll 88 and thus inhibiting its antibackup function. This permits the takeup reel to yield tape.

The supply reel is mounted on a shaft 138 which supports a brake roll 136. Roll 136 cooperates with a brake band 120 connected at its one end to a stationary pin 122 and at its other end to dancer arm 126 via a spring 124. During forward tape feeding operations the supply reel is rotated strictly under the control of tape tension and when the reel gives up sufficient tape to lower the tape tension, arm 126 pivots to the left (FIG. 3), applying a braking force to roll 136 which arrests the reel.

The suction drag brakes 24 and 32 (FIG. 1) utilized during forward and backspace feeding of the tape are supplied with subatmospheric pressure by a vacuum pump 175 (FIG. 3). Pressure from the pump is channeled to the brakes by a pressure conduit including hose segments 160, 162, 164, 170 and 174. These sections are joined by T-connections 166, 168 and 172.

A single pole, double throw switch 220, (FIG. 3) is provided as the main on-off control for the system. When the switch is thrown to the left, the system is in the off condition. Moving the switch to the right energizes the vacuum pump 175 and motor 52 and places the system in the forward feed mode.

The system is provided with a high-speed tape rewind mechanism including a motor 192 which is mounted on a bracket 190 adapted to pivot about pivot support 188. Motor 192 drives a rewind capstan 194 aligned to cooperate with roll 136. A control arm 186 is connected to the bracket 190 and connects the bracket to a diaphragm-type pneumatic transducer 180. Transducer 180 is controlled by the vacuum supply via a conduit 178 connected into the vacuum system via T-connector 168. The transducer is mounted on a vertically adjustable L-bracket 181 supported on a pedestal 183 and has an operating member 185 projecting from its lower end. When vacuum is applied, member 185 is drawn and held upwardly against the bias of a compression spring 182. When the vacuum pump is deenergized atmospheric pressure is applied to the system, causing spring 182 to force member 185 to its lowermost position. The member is connected via a link 184 to the end of control arm 186 so that when vacuum is applied the rewind drive capstan 194 is maintained out of contact with roll 136. When the vacuum is dropped the drive capstan 194 is pivoted into contact with roll 136, enabling the rewind drive. A single pole—single throw rewind control switch 222 is connected to energize motor 192 from the left-hand contact of on-off switch 220. Thus, with the latter switch in the "off" position switch 222 may be operated to start the rewind operation.

A second pneumatic transducer 200 is connected to the vacuum system by a conduit 176 which connects to T-joint 172. Transducer 200 is identical to transducer 180, being mounted on an adjustable L-bracket 201 and having an operating member 203 projecting toward detent 204. A compression spring 202 biases member 203 outwardly so that when vacuum is dropped tip of member 203 pivots detent 204 out of its operative antibackup position to permit the takeup reel to be rotated in the rewind direction. Of course, when vacuum is applied during forward feeding, member 203 is drawn in and maintained out of contact with the detent to permit the normal function thereof.

During rewind, the unidirectional bushing which connects brake roll 86 to takeup shaft 82 nullifies the braking effect of brake band 85 and thus the position of dancer arm 96 is irrelevant during rewind. Actually, arm 96 will be drawn by the tape tension to its extreme left-hand position (as viewed in FIG. 3).

Operation—Forward Feed Mode

For forward feed operation switch 220 is placed in its right-hand position whereupon vacuum pump 175 operates transducers 180 and 200, removing rewind capstan 194 from engagement with roll 136 and permitting spring 210 to draw detent 204 into its operative position. Also, tape feed motor 52 is energized so that operation of solenoid 156 activates pinch roll 22 to feed tape forward.

Each forward feed increment causes dancer arm 96 (FIG. 3) to rock to the right, pivoting takeup reel drive capstan 94 into contact with drive roll 88 whereupon the takeup reel winds up tape, which in turn tends to draw arm 96 back to the left. The net result is that between forward feed strokes arm 96 reaches a position of equilibrium wherein the continuously rotating capstan 94 is permitted to dance lightly on roll 88. The antibackup effect of detent 204 maintains takeup shaft 82 in a stable position notwithstanding such hunting or dancing operation, eliminating undesirable oscillation of the takeup reel. Brake band 85 operates to arrest each takeup swing of the takeup shaft before the inertial effects thereof can overstress the tape.

When tape backspacing is called for, solenoid 154 energizes pinch roll 34, pulling the tape in reverse and drawing arm 96 leftwardly (FIG. 3) to supply the tape. If the backspace is a long one, the continued movement of arm 96 causes arm 104 to pull detent 204 out of its antibackup position, allowing the takeup reel to yield tape. This in turn moves arm 96 to the right whereupon detent 204 is restored by spring 210 to its operative position.

Operation—Rewind Mode

When switch 220 is moved to its left-hand position motor 52 and vacuum pump 175 are deenergized. The dropping of vacuum causes the operating members 185 and 203 of transducers 180 and 200, respectively, to be driven to their outward positions, placing the rewind drive capstan 194 in contact with roll 136 and moving antibackup detent 204 out of operative position. Thereafter, closing of rewind switch 222 energizes motor 192 to drive the supply reel rapidly in the takeup direction. During rewind, the tension in the tape draws arm 96 to the extreme left position and the combined effect of the tension on the tape and the clockwise rotation of roll 136 acting on brake band 120 draws the arm 126 to its extreme right-hand position.

It will be appreciated that various changes in the form and details of the described preferred embodiment may be effected by persons of ordinary skill without departing from the true spirit and scope of the invention.

We claim:

1. A tape handler comprising, in combination:
a rotatable supply shaft including a tape supply reel;
a rotatable takeup shaft including a tape takeup reel;
means for driving said takeup shaft in the takeup direction to wind up tape fed from said supply reel;
detent means acting on said takeup shaft to prevent rotation of said shaft in the nontakeup direction;
a selectively operable rewind motor;
a rewind drive capstan connected to said rewind motor and selectively engageable with said supply shaft;
vacuum means selectively energizable to generate a supply of pressure below atmospheric;
pneumatic transducer means connected to said vacuum means and operable in response to subatmospheric pressure to hold said rewind capstan out of contact with said supply shaft and operable in response to substantially atmospheric pressure to move said capstan into contact with said supply shaft and to disable said detent means; and
control means selectively operable to either of two states, a forward feed state wherein said control means energizes said vacuum means and a rewind state wherein said control means deenergizes said vacuum means and energizes said rewind motor.

2. The tape handler set forth in claim 1 further comprising:
suction drag brake means contiguous with said tape and connected to said vacuum means whereby a constant friction drag is applied to said tape during forward feed thereof and not during rewind.

3. A tape handler comprising, in combination:
means for feeding said tape;
a tape takeup reel adapted to wind up tape fed by said feeding means;
a rotatable takeup shaft on which said takeup reel is mounted;
tape-tensioning means acting on the segment of tape extending between said feeding means and said reel, said tensioning means including a member adapted to sense changes in the length of said segment;
a rotating drive capstan for selectively applying takeup torque to said shaft under control of said member;
a fixed mount spaced from said shaft;
a movable wedge member positioned between said shaft and said fixed mount, said wedge having a friction surface adapted to contact said shaft such that rotation of the latter in the nontakeup direction is impeded by the action of said wedge against said fixed mount;
means for increasing contact between said wedge's friction surface and said shaft when said member is in a first condition; and
means for decreasing contact between said wedge's friction surface and said shaft when said member is in a second condition.

4. The tape handler set forth in claim 3 wherein said member comprises a pivotable, spring-biased arm engaging said segment of tape.

5. The tape handler set forth in claim 4 further comprising:
a tension spring biasing said wedge into contact with said shaft; and
a link engageable with said arm when the length of said segment decreases to a predetermined amount whereupon further decrease in the length of said segment causes said arm to act on said link to draw said wedge out of engagement with said shaft, permitting rotation of said shaft in the nontakeup direction.

6. The tape handler comprising, in combination:
means for feeding said tape;
a tape takeup reel adapted to wind up take fed by said feeding means;
a rotatable takeup shaft on which said takeup reel is mounted;
tape-tensioning means acting on the segment of tape extending between said feeding means and said reel, said tensioning means including a member adapted to sense changes in the length of said segment;
a rotating drive capstan for selectively applying takeup torque to said shaft under control of said member;
detent means acting on said shaft to prevent rotation of said reel in the nontakeup direction, said detent means operating independent of the state of said member when the latter is in a first condition;
means for rendering said detent means inoperative when said member is in a second condition; and
a brake band wrapped about a portion of said shaft and having one end secured to said member such that a decrease in the length of said segment to a predetermined amount causes said band to apply a braking force to said shaft and continued decrease in the length of said segment causes said braking force to increase.

7. The tape handler set forth in claim 6 further comprising:
means for permitting unidirectional relative rotation between the portion of said shaft engaging said brake band and the portion of said shaft supporting said reel whereby rotation of said reel in the nontakeup direction is unaffected by the operation of said brake band.

8. A tape handler comprising, in combination;
selectively operable means for feeding tape in either of two directions;
a takeup reel for taking up tape in response to the feeding thereof in a first of said directions;
a takeup shaft on which said takeup reel is mounted;
a pivotable, spring-biased arm engaging the segment of tape extending between said feeding means and said reel;
a rotating drive capstan;
means supporting said capstan for movement into and out of engagement with said takeup shaft in accordance with the angular position of said arm whereby said reel is driven to take up tape fed in said first direction from by said feeding means;
detent means acting on said shaft for preventing movement thereof in the nontakeup direction; and
control means responsive to the feeding of a predetermined amount of tape in the other of said directions for disabling said detent means.

9. The tape handler set forth in claim 8 wherein said detent means comprises:
a fixed mount spaced from said shaft; and
a movable wedge member positioned between said shaft and said fixed mount, said wedge having a friction surface adapted to contact said shaft such that rotation of the latter in the nontakeup direction is impeded by the action of said wedge against said fixed mount.

10. The tape handler set forth in claim 9 wherein said control means comprises:
a link engageable with said arm when the length of said tape segment decreases to a predetermined amount whereupon further decrease in the length of said segment causes said arm to act on said link to draw said wedge out of engagement with said shaft, permitting rotation thereof in said nontakeup direction.